United States Patent [19]
Coleman et al.

[11] 3,751,668
[45] Aug. 7, 1973

[54] CONCENTRIC CYLINDER ASSEMBLY FOR PRODUCING PULSED NEUTRONS

[75] Inventors: Harold L. Coleman, Dayton; Harold A. Malson, Kettering; Howard R. DuFour, New Carlisle; Richard G. Olt, Dayton, all of Ohio

[73] Assignee: Monsanto Research Corporation, St. Louis, Mo.

[22] Filed: Oct. 28, 1970

[21] Appl. No.: 84,675

[52] U.S. Cl. ............................................. 250/84.5
[51] Int. Cl. ............................................. G21g 3/04
[58] Field of Search ............... 250/83.6 PS, 84.5, 250/83.1, 83.6 W

[56] References Cited
UNITED STATES PATENTS
3,379,884  4/1968  Youmans ................... 250/83.6 PS
3,435,216  3/1969  Givens ........................ 250/83.1
2,303,688  12/1942  Fearon ..................... 250/83.6 PS Primary Examiner—Archie R. Borchelt
Assistant Examiner—Davis I. Willis
Attorney—L. Bruce Stevens, Jr.

[57] ABSTRACT

Pulsed bursts of neutron are produced from a source in which strips of radioactive material are placed on the inner surface of a cylinder, and low Z target material is placed on the outer surface of an inner concentric cylinder. As the inner cylinder is rotated, the radioactive material and the target material are matched to produce a burst of neutrons.

5 Claims, 4 Drawing Figures

PATENTED AUG 7 1973　　　　　　　　　3,751,668

INVENTORS.
HAROLD L. COLEMAN
HAROLD A. MALSON
HOWARD R. DUFOUR
RICHARD G. OLT
BY L. Bruce Stevens, Jr
ATTORNEY

CONCENTRIC CYLINDER ASSEMBLY FOR PRODUCING PULSED NEUTRONS

BACKGROUND OF THE INVENTION

The invention herein described was made in the course of or under a contract with the Department of the Navy.

1. Field of the Invention

This invention relates to a neutron generator wherein the neutrons are produced by alpha particles from the decay of a radioactive isotope impinging on a light element. By a critical arrangement of the elements the emission of neutrons can be stopped or started at will.

2. Description of the Prior Art

Neutron sources are well-known in the prior art, and have been used for a wide variety of applications. They have been extensively used in oil well logging operations wherein formations are irradiated from a neutron source for the production of secondary radiation. Measurements are made of the secondary radiation to obtain information about the formations under investigation.

For these well logging operations pulsed neutron sources have been found to be particularly useful, and a number of pulsed radiation sources are taught by the prior art for these operations. As an example, U.S. Pat. No. 3,435,216 issued Mar. 25, 1969 and U.S. Pat. No. 3,389,257 issued June 18, 1968 teach the use of rotating shutters to pulse the neutrons.

Additionally, U.S. Pat. No. 3,388,253 issued June 11, 1968 rotates a target past a radioactive source secured to a support for the production of bursts of primary radiation, and U.S. Pat. No. 2,275,748 issued Mar. 10, 1942 suspends a source of alpha particles between the outer edges of the two disks which are rotated by means of a motor to produce pulsed neutrons.

Despite these advances made in pulsed neutron sources, all of the prior art sources have certain disadvantages. Because of the penetrating nature of neutrons, it is difficult to stop many of the neutrons using a rotating shutter. Additionally, many of these sources, because of the radioisotope used or the configuration of the sources, emit a large neutron flux when in the "off" position. Furthermore, the amount of radioisotope used in the rotating target sources has been found to be a limiting factor to the production of large neutron fluxes.

In addition to these oil well logging operations, neutron sources are widely used in the start-up of nuclear reactors, and to calibrate instruments used in the operation of these reactors. Thus, pulsed neutron sources, or on the other hand, neutron sources having a predetermined variable flux, find ready application in this and similar fields.

BRIEF SUMMARY OF THE INVENTION

It is therefore one object of the present invention to prepare a pulsed or modulated (adjustable flux) neutron source.

It is another object of the invention to prepare a pulsed neutron source having a rotating target.

It is yet another object of the invention to prepare a pulsed neutron source having a greater amount of radioisotope in a small configuration for more efficient utilization of the target material.

These and other objects of the present invention are achieved by a neutron generator that emits pulsed bursts or adjustable fluxes of neutrons which comprises a hollow cylindrical body; strips of radioactive material mounted on the inner surface of the hollow cylindrical body, wherein the strips mounted parallel to the axis of rotation provide a source of radioactive particles; an inner cylinder rotatably mounted inside of the hollow cylindrical body; strips of low Z target material affixed to or exposed on the outer surface of the inner cylinder, wherein the strips are affixed parallel to the axis of rotation; and means of rotating the inner cylinder relative to the hollow cylindrical body to bring the strips of target material in close proximity to the strips of radioactive material to generate the neutrons.

DETAILED DESCRIPTION

Figure 1:
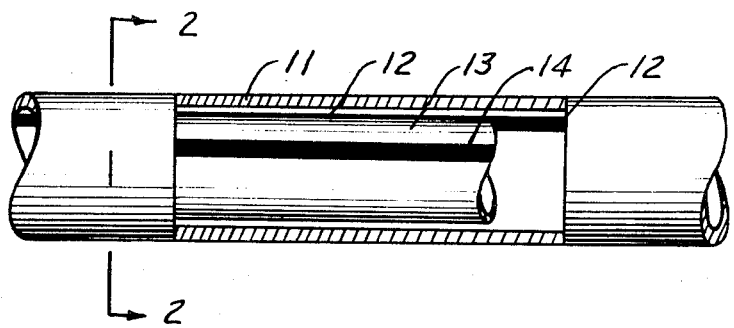
FIG. 1 is a cutaway view of the pulsed neutron source.

Referring now to FIG. 1 a hollow right circular cylinder may be used as the hollow cylindrical body 11. On the interior surface of the hollow cylindrical body 11, strips of radioactive material 12 are affixed on the surface in a line parallel to the axis of rotation.

An inner cylinder 13 is rotatable mounted inside the hollow cylindrical body 11. The inner cylinder 13 may be rotated manually or by means of motors or engines, the means not being critical to the present invention. Strips of target material 14 are exposed on the outer surface of cylinder 13.

Figure 2:
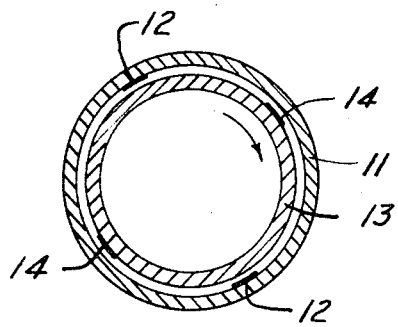
FIG. 2 is a cross-sectional view of the pulsed neutron source through 22 of FIG. 1.

The strips of radioactive material 12, in addition to extending along the length of the inner cylinder 13 in a plane parallel to the axis of rotation, are preferably arranged in a configuration to match the strips of target material 14 on the outer surface of the inner cyliner 13, as shown in FIG. 2. Although the strips of radioactive material need not be matched with the strips of target material, depending upon the needs of the user, maximum intensity of neutron pulses are obtained when the strips are matched. Similarly, the strips could be spiralled on the surfaces of the respective cylinders, but for ease of fabrication, they are normally placed in a line parallel to the axis of rotation.

Figure 3:
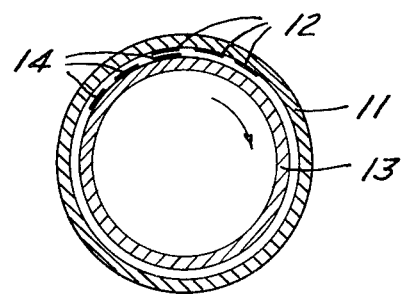
FIG. 3 is also a cross-sectional view to demonstrate a different arrangement of the elements to obtain a particular neutron pulse.

Shaped neutron pulses can be obtained by a critical arrangement of the strips of radioactive material and the target material, as might occur to one skilled in the art. As an example, a step-wise increase in neutron flux could be obtained by matching three strips of target material and three strips of radioisotope material within, say, an arc of 90° such as is shown in FIG. 3. Thus, the stepwise increase in neutron flux is achieved when the inner cylinder is rotated to match one strip of target material with one strip of radioactive material, then the inner cylinder is further rotated to match two strips of target material and radioactive material, etc. Any number of strips could be used depending upon the desire of the user, and a neutron source of this type could be used as a variable flux source by matching the appropriate number of target strips with radioactive strips.

On the other hand, if only one strip each of radioactive material and target material were used, a neutron pulse would be obtained when the two strips were matched, but the flux would drop to near zero when the target material was rotated to 180° away from the radioactive strip, thus making an "on-off" neutron source for ease of storage when the source is not in use.

Figure 4:
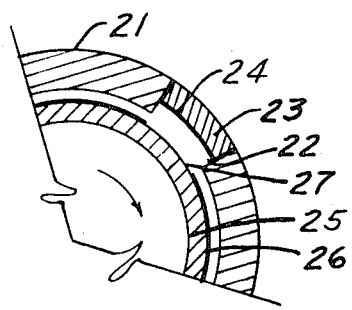
FIG. 4 is an arc of a cross-sectional view, the parts being out of proportion to show the details of one embodiment.

FIG. 4 is an arc of a cross-sectional view of the source to show an alternative configuration of the elements. A hollow right cylinder 21 having slots 22 through the cylinder wall parallel to the long axis of rotation is prepared. A shim 23 is fabricated to fit into slot 22, and a radioisotope 24 is deposited on the concave surface of shim 23. Thus, when the shim 23 is placed in the slot 22 and affixed to the cylinder 21, a strip of radioactivity parallel to the axis of rotation is provided. A beryllium inner cylinder 25 is then coated with an alpha-stopping material 26, except for a strip 27 parallel to the axis of rotation to expose the beryllium metal. The partially coated beryllium inner cylinder 25 is then rotatably mounted inside of the hollow cylinder 21.

In operation, the beryllium inner cylinder 25 is rotated in the outer cylinder 21 until the strip 27 of exposed beryllium matches the strip of radioactivity along the inner surface of outer cylinder 21. The radiation from the radioisotope 24 impinges on the exposed beryllium to produce neutrons. As the inner cylinder 25 is rotated further so that the strips do not match, the alpha-stopping material 26 coating the beryllium prevents the radiation from impinging on the beryllium. Thus, the source may be operated as an "on-off" neutron source, or by continuously rotating the inner cylinder, operate as a pulsed neutron source.

The radioisotope in the neutron source may be either an alpha, beta or gamma emitting isotope, but alpha emitters have been found to be particularly useful because the range of the alpha particle in air is short, and a minimum number of neutrons are produced when the source is in the "off" position. Polonium-210 has been found to be especially useful in the source as a radioactive material because it is highly radioactive and is almost a pure alpha emitter, with only negligible beta and gamma radiation. Plutonium-238 or americium-241 may also be used for the radioactive material to overcome the objectionable feature of the short half-life of polonium-210. Other radioisotopes might also be used as might occur to one skilled in the art.

The target material must contain an element having a relatively low atomic number (Z) in order to produce neutrons by bombardment from nuclear radiation. Generally, an element below calcium in the periodic table of the elements must be used, and beryllium and boron have been found to be quite useful for this application.

The following examples are given as an illustration of the invention, and not as a limitation to the scope of the invention.

EXAMPLE 1

About 20 curies of polonium-210 were deposited on the inside of a hollow copper cylinder, approximately four inches long and one inch in diameter. The polonium-210 was deposited at 1-2 curies per square centimeter in two strips parallel to the long axis of the cylinder and centered 180° apart on the circumference. Beryllium metal was then affixed in two strips 180° apart on the outer surface of an inner copper cylinder, which is concentric to, and fits inside of, the copper cylinder containing the polonium. The copper cylinder containing the polonium with the inner copper cylinder therein was placed in an external stainless steel sheath filled with helium or other inert gas to prevent oxidation of the polonium-210. The inner cylinder was then connected to a drive shaft extending through the sheath to the outside of the source to permit rotation of the inner cylinder. Thus the inner cylinder may be manually turned to the "on" or "off" position, or mechanically turned to provide pulsed bursts of neutrons.

EXAMPLE 2

Two slots were milled 180° apart on the outside of a hollow copper cylinder which was approximately four inches long and one inch in diameter. Two shims were then fabricated to fill the slots milled on the copper cylinder. About 10 curies of polonium-210 were then deposited on the concave surface of each shim, and the shims were then mounted in the milled slots to form two strips of radioactive material, 180° apart. A solid beryllium cylinder having two strips of masking material 180 degrees apart was then coated with nickel to a thickness of one mil, sufficient to stop an alpha particle. When the masking strips were removed, two strips of target material 180° apart were exposed. The coated beryllium cylinder was then rotatably mounted inside of the copper cylinder containing the strips of polonium. The two cylinders were placed in a hermetically sealed stainless steel outer container filled with helium. The beryllium cylinder was then rotated using a magnetic coupling through the wall of the stainless steel.

In the "on" position, or when the beryllium strips and the polonium-210 strips were matched, approximately $1.6 \times 10^7$ neutrons per second were generated. When the inner cylinder was rotated 90° to the "off" position, only $1.6 \times 10^4$ neutrons per second were generated, a significant reduction in neutron flux.

A number of modifications might be made to the above examples. For instance the inner cylinder might be rotated by means of a bellows deflection coupling for positive drive through a hermetically sealed outer container. Alternatively the hollow cylinder could be rotated instead of the inner cylinder to match the strips of radioactive material and the target material, or the location of the target material and the radioactive material might be switched.

Although the invention has been described in terms of specified embodiments which are set forth in considerable detail, it should be understood that this is by way of illustration only, and that the invention is not necessarily limited thereto, since alternative embodiments and operating techniques will become apparent to those skilled in the art in view of the disclosure. Accordingly, modifications are contemplated which can be made without departing from the spirit of the described invention.

We claim:

1. A neutron generator that emits pulsed bursts of neutrons which comprises:
    a. a hollow cylindrical body rotatable on the long axis thereof;
    b. at least one strip of radioactive material mounted on the inner surface of the hollow cylindrical body paralled to the axis of rotation to provide a source of radioactive particles;

c. an inner cylinder rotatably mounted inside of the hollow cylindrical body;

d. at least one strip of low Z target material on the outer surface of the inner cylinder, wherein the strip is parallel to the axis of rotation; and e. means of rotating the inner cylinder relative to the hollow cylindrical body to bring the strip of target material in close proximity to the strip of radioactive material to generate the neutrons.

2. A neutron source of claim 1 wherein the radioactive material is polonium-210.

3. A neutron source of claim 1 wherein the low Z target material is beryllium.

4. A neutron source of claim 1 wherein two strips of polonium-210 are deposted approximately 180° apart on the inner surface of the hollow cylindrical body, and two strips of beryllium are mounted approximately 180° apart on the outer surface of the inner cylinder.

5. A neutron source of claim 1 which comprises:

a. a hollow cylindrical body rotatable on the long axis thereof and having two slots through the cylinder wall which are parallel to the axis of rotation, the slots being 180° apart;

b. shims mounted on the hollow cylindrical body to fill the slots on the outer surface of the hollow cylindrical body;

c. polonium-210 deposited on the concave surface of the shims to supply a strip of radioactive particles to the inside of the hollow cylindrical body when the shims are in place;

d. a beryllium inner cylinder rotatably mounted in the hollow cylindrical body;

e. a coating of nickel to stop alpha particles, the coating covering the surface of the beryllium cylinder with two strips approximately 180° apart and parallel to the axis of rotation said strips being free of said coating; and f. means of rotating the inner cylinder relative to the hollow cylindrical body to bring the exposed beryllium strips in close proximity to the strips of radioactive material to generate the neutrons.

* * * * *